(12) United States Patent
Ng et al.

(10) Patent No.: US 11,106,266 B2
(45) Date of Patent: Aug. 31, 2021

(54) COMPUTER SYSTEM MANAGEMENT FOR SELECTING A FIRST ALGORITHM BASED ON A THIRD DATA TYPE AND A SECOND ALGORITHM BASED ON A TARGET VALUE

(71) Applicant: ASUSTEK COMPUTER INC., Taipei (TW)

(72) Inventors: Teng-Liang Ng, Taipei (TW); Ji-Kuang Tan, Taipei (TW); Bing-Min Lin, Taipei (TW); Chen-Wei Fan, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 64 days.

(21) Appl. No.: 16/596,480

(22) Filed: Oct. 8, 2019

(65) Prior Publication Data

US 2020/0233477 A1 Jul. 23, 2020

(30) Foreign Application Priority Data

Jan. 22, 2019 (TW) ................................. 108102433

(51) Int. Cl.
*G06F 1/324* (2019.01)
(52) U.S. Cl.
CPC .................... *G06F 1/324* (2013.01)
(58) Field of Classification Search
CPC ...................................................... G06F 1/324

(Continued)

(56) References Cited

U.S. PATENT DOCUMENTS 7,146,514 B2 * 12/2006 Kaushik ................ G06F 1/3203
713/322
2003/0229814 A1 * 12/2003 Garnett ................ G06F 9/4411
713/322

(Continued)

FOREIGN PATENT DOCUMENTS

CN 100461117 C 2/2009
CN 107204773 A 9/2017

OTHER PUBLICATIONS

ASUS Launches Intel 2390 Series Motherbeards; https://www.guru3d.com/news-story/asus-launches-intel-zS390-series-motherboards.html; Oct. 8, 2018; 2 pages.

(Continued)

*Primary Examiner* — Suresh Suryawanshi
(74) *Attorney, Agent, or Firm* — Muncy, Geissler, Olds & Lowe, P.C.

(57) ABSTRACT

A computer system management method including the following steps is provided. First, a target value and at least one input parameter are set. The target value and the at least one input parameter are related to at least one of a first data type and a second data type, and the first data type is related to the second data type. Then, a first algorithm is determined based on a third data type, and an input value of the third data type is calculated by using the first algorithm. The third data type is related to the first data type and the second data type. Afterward, a second algorithm is determined based on the target value, the at least one input parameter, and the input value, and an estimated value of the second data type is calculated by using the second algorithm. A computer system is also provided.

6 Claims, 3 Drawing Sheets

(58) Field of Classification Search
USPC .......................................................... 713/322
See application file for complete search history.

(56) References Cited

U.S. PATENT DOCUMENTS

| | | | |
|---|---|---|---|
| 2007/0050650 A1* | 3/2007 | Conroy ..................... | G06F 1/26 713/300 |
| 2007/0156370 A1* | 7/2007 | White ................... | G06F 1/3203 702/132 |
| 2015/0356085 A1* | 12/2015 | Panda ..................... | G06N 5/04 707/748 |
| 2019/0041971 A1* | 2/2019 | Ananthakrishnan ......................... | G06F 9/30101 |

OTHER PUBLICATIONS

Taiwanese Office Action based on corresponding Application No. 108102433; dated Jan. 7, 2020.

* cited by examiner

COMPUTER SYSTEM MANAGEMENT FOR SELECTING A FIRST ALGORITHM BASED ON A THIRD DATA TYPE AND A SECOND ALGORITHM BASED ON A TARGET VALUE

CROSS-REFERENCE TO RELATED APPLICATION

This application claims the priority benefit of Taiwan Application Serial No. 108102433, filed on Jan. 22, 2019. The entirety of the above-mentioned patent application is hereby incorporated by reference herein and made a part of the specification.

BACKGROUND OF THE INVENTION

Field of the Invention

The disclosure relates to a computer system, and in particular, to a computer system management method.

Description of the Related Art

The performance of a computer system is influenced by various different factors. Individual performance difference of hardware components such as a central processing unit (CPU), a dynamic random access memory (DRAM), a heat sink, a graphics card, a storage device, or a mainboard of the computer system affects the overall performance of the computer system. Therefore, to achieve an ideal performance of the computer system, it is not sufficient to rely on only one setting.

BRIEF SUMMARY OF THE INVENTION

The disclosure provides a computer system management method. The computer system management method includes the following steps. First, a target value and at least one input parameter are set. The target value and the at least one input parameter are related to at least one of a first data type and a second data type, and the first data type is related to the second data type. Then, a first algorithm is determined based on a third data type, and an input value of the third data type is calculated by using the first algorithm. The third data type is related to the first data type and the second data type. Afterward, a second algorithm is determined based on the target value, the at least one input parameter, and the input value, and an estimated value of the second data type is calculated by using the second algorithm.

The disclosure also provides another computer system management method. The computer system management method includes the following steps. First, at least one input parameter is set. The input parameter is related to at least one of a first data type and a second data type, and the first data type is related to the second data type. Then, a first algorithm is determined based on a third data type, and an input value of the third data type is calculated by using the first algorithm. The third data type is related to the first data type and the second data type. Afterward, a second algorithm is determined based on the at least one input parameter and the input value, and an estimated value of the second data type is calculated by using the second algorithm.

The disclosure also provides a computer system. The computer system includes at least one sensor, a memory, an input interface, and a calculation unit. The sensor is configured to detect information about at least one of a first data type, a second data type, and a third data type. The first data type is related to the second data type, and the third data type is related to the first data type and the second data type. The memory is configured to store a first algorithm and a second algorithm. The first algorithm is determined based on information about the third data type, and the second algorithm is determined based on information about the first data type and the second data type. The input interface is configured to input a target value and at least one input parameter. The calculation unit is configured to calculate an input value of the third data type by using the first algorithm, and calculate an estimated value of the second data type by using the second algorithm, the target value, the at least one input parameter, and the input value.

Compared with a conventional computer system management method, the computer system management method provided in the disclosure dynamically adjusts settings of different computer systems based on differences between the computer systems and aspects to be optimized, such as calculation performance, heat dissipation efficiency, and energy conservation, thereby solving the problem that the conventional method provides only one setting. Therefore, the computer system management method provided in the disclosure properly adjusts settings of various different computer systems based on users' requirements.

Specific embodiments of the disclosure will be further described by using the following examples and drawings.

DETAILED DESCRIPTION OF THE EMBODIMENTS

Specific embodiments of the disclosure will be described in further detail below with reference to schematic drawings. The advantages and features of the disclosure will become more apparent from the following description and claims. It should be noted that the drawings are all in a very simplified form and are not drawn to accurate scale, but are merely used for convenience and clarity of description of the embodiments of the disclosure.

Figure 1:
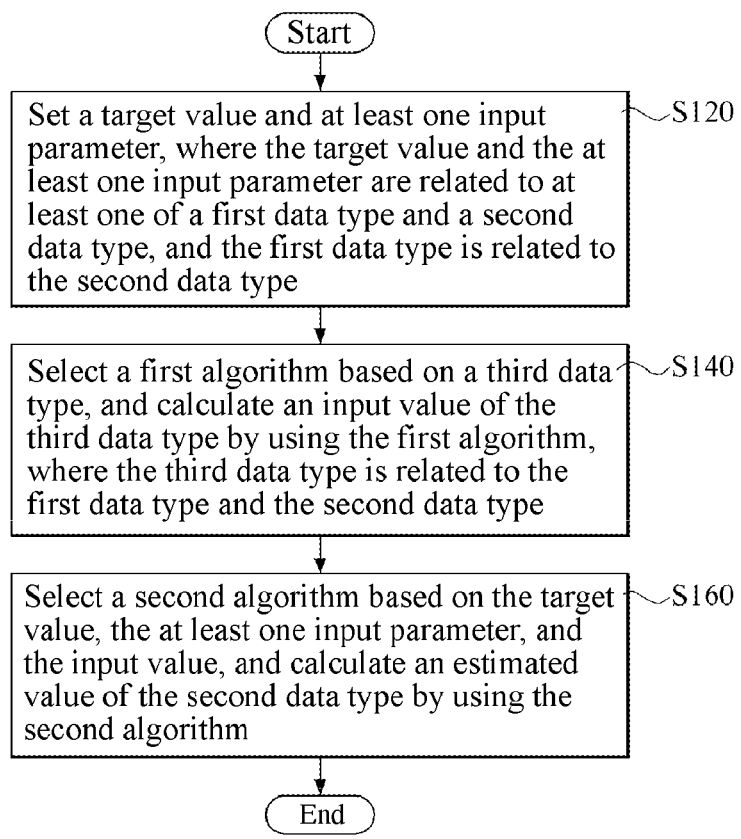
FIG. 1 is a flowchart of an embodiment of a computer system management method according to the disclosure.

FIG. 1 is a flowchart of an embodiment of a computer system management method according to the disclosure. The computer system management method is applied to a computer system. In an embodiment, the computer system includes a central processing unit (CPU), a mainboard, a memory, and a storage device (such as a hard disk or a solid-state disk). In an embodiment, the computer system management method is applied to any electronic device having a computing capability.

The computer system management method includes the following steps.

First, as shown in step S120, a target value and at least one input parameter are set. The target value and the at least one input parameter are related to at least one of a first data type and a second data type, and the first data type is related to the second data type. In an embodiment, the first data type is an operating frequency of the CPU, and the second data type is an operating voltage of the CPU. In another embodiment, the first data type is an operating voltage of the CPU, and the second data type is an operating frequency of the CPU.

Then, as shown in step S140, a first algorithm is determined based on a third data type, and an input value of the third data type is calculated by using the first algorithm. The third data type is related to the first data type and the second data type. In an embodiment, the third data type is a heat dissipation capability of a heat sink.

Afterward, as shown in step S160, a second algorithm is determined based on the target value, the at least one input parameter, and the input value, and an estimated value of the second data type is calculated by using the second algorithm.

The first data type, the second data type, and the third data type are public or nonpublic data defined by a component manufacturer, or measured data. In an embodiment, a manufacturer of the CPU defines data including a preset frequency and a preset voltage. The preset frequency is public data, and the preset voltage is nonpublic data. The data can be taken as part of big data to generate the first algorithm and the second algorithm in this embodiment.

The computer system management method provided in the disclosure enables a user to obtain required data or information by using data (i.e., big data) from various sources, regardless of whether the data is public or nonpublic data. In this way, settings of different computer systems are dynamically adjusted based on differences between the computer systems and aspects to be optimized, such as calculation performance, heat dissipation efficiency, and energy conservation.

The computer system management method of this embodiment is described below by using estimation of an operating voltage as an example. In this embodiment, the first data type is the operating frequency of the CPU, the second data type is the operating voltage of the CPU, and the third data type is the heat dissipation capability of the heat sink.

Table 1 below shows a corresponding formula generated from the first algorithm (corresponding to step S140 in FIG. 1). The formula is used to calculate the heat dissipation capability of the heat sink. As shown in the table, the formula is related to the operating voltage of the CPU. That is, the first algorithm is related to the operating voltage of the CPU (i.e., the first data type).

TABLE 1

| i | $b_i$ | $x_i$ |
|---|---|---|
| 0 | 294.876538 | |
| 1 | −1.372105 | Highest average temperature |
| 2 | −0.065138 | Lowest average temperature |
| 3 | 0.162063 | Voltage |
| 4 | −1.014756 | Power consumption |

$y = b_0 + (b_1 \cdot x_1) + (b_2 \cdot x_2) + \ldots$
where $b_i$ is a parameter of the formula derived from the algorithm (i.e., a parameter of the first algorithm); $x_i$ is an input parameter of the formula; and y is an estimation result.

Table 2 below shows a corresponding formula generated from the second algorithm (corresponding to step S160 in FIG. 1). The formula is used to calculate an operating voltage corresponding to a target frequency or an estimated maximum frequency. The target frequency or the estimated maximum frequency is the target value in step S120 in FIG. 1. A preset voltage 1 to a preset voltage 4 in the table are the input parameters in step S120 in FIG. 1. The heat dissipation capability calculated in Table 1 is an input value and used as an input parameter $x_6$ of the formula.

TABLE 2

| i | $b_i$ | $x_i$ |
|---|---|---|
| 0 | −704.833213 | |
| 1 | 0.260527 | Target frequency or estimated maximum frequency |
| 2 | −0.452948 | Preset voltage 1 |
| 3 | 0.177883 | Preset voltage 2 |
| 4 | 0.768274 | Preset voltage 3 |
| 5 | 0.027614 | Preset voltage 4 |
| 6 | −0.260264 | Heat dissipation capability |

$y = b_0 + (b_1 \cdot x_1) + (b_2 \cdot x_2) + \ldots$
where $b_i$ is a parameter of the formula derived from the algorithm (i.e., a parameter of the first algorithm); $x_i$ is an input parameter; and y is an estimation result.

The first algorithm and the second algorithm used in this embodiment are linear regression solved by a normal equations. The algorithm used in the disclosure varies with actual conditions such as precision, training time, linearity, and the number of parameters.

Figure 2:
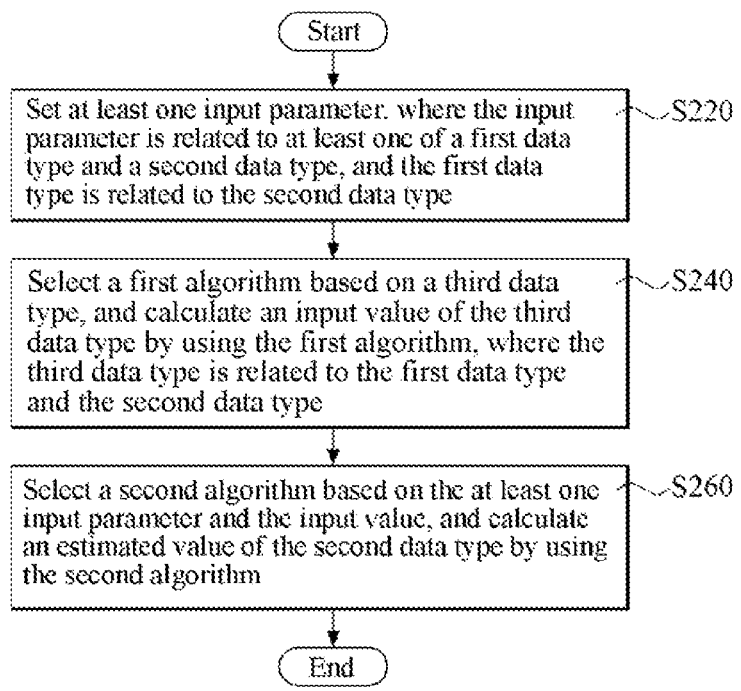
FIG. 2 is a flowchart of another embodiment of a computer system management method according to the disclosure.

In the computer system management method according to the embodiment in FIG. 1, at least one input parameter and a target value need to set (as described in step S120) for subsequent estimation. FIG. 2 is a flowchart of another embodiment of a computer system management method according to the disclosure. Compared with the embodiment in FIG. 1, in the computer system management method of this embodiment, only an input parameter needs to be set, and no target value needs to be input.

The computer system management method of this embodiment includes the following steps.

First, as shown in step S220, at least one input parameter is set. The input parameter is related to at least one of a first data type and a second data type, and the first data type is related to the second data type.

Then, as shown in step S240, a first algorithm is determined based on a third data type, and an input value of the third data type is calculated by using the first algorithm. The third data type is related to the first data type and the second data type. This step is the same as step S140 in FIG. 1.

Afterward, as shown in step S260, a second algorithm is determined based on the at least one input parameter and the input value, and an estimated value of the second data type is calculated by using the second algorithm.

The computer system management method of this embodiment is described below by using estimation of a maximum frequency as an example. In this embodiment, the first data type is an operating voltage of a CPU, the second data type is an operating frequency of the CPU, and the third data type is a heat dissipation capability of a heat sink.

The formula shown foregoing in Table 1 corresponds to step S240 in this embodiment. Table 3 shows below is a corresponding formula generated from the second algorithm (corresponding to step S260 in FIG. 2). The formula is used to estimate the maximum frequency. The heat dissipation capability calculated in Table 1 is an input value and is used as an input parameter $x_5$ of the formula.

TABLE 3

| i | $B_i$ | $x_i$ |
|---|---|---|
| 0 | −2688.4 | |
| 1 | 507.441 | Preset frequency 1/preset voltage 1 |
| 2 | −317.19 | (Preset voltage 1-Preset voltage 2)/(Preset frequency 1-Preset frequency 2) |

TABLE 3-continued

| i | $B_i$ | $x_i$ |
|---|---|---|
| 3 | −132.47 | Preset frequency 1/preset voltage 3 |
| 4 | −365.03 | (Preset voltage 3-Preset voltage 4)/(Preset frequency 1-Preset frequency 2) |
| 5 | 10.7291 | Heat dissipation capability |

$y = b_0 + (b_1 \cdot x_1) + (b_2 \cdot x_2) + \ldots$
where $b_i$ is a parameter of the formula derived from the algorithm (i.e., a parameter of the first algorithm); $x_i$ is an input parameter; and y is an estimation result.

In the embodiments of Table 1 to Table 3, the first data type, the second data type, and the third data type are selected from the group consisting of the operating voltage and the operating frequency of the CPU and the heat dissipation capability, and the operating voltage and the operating frequency of the CPU in the computer system are optimized based on the obtained estimated data. In some other embodiments, the first data type, the second data type, and the third data type are selected from the group consisting of the operating frequency of the CPU, the operating voltage of the CPU, the heat dissipation capability of the heat sink, a temperature of a mainboard, information about a memory, and information about a graphics card.

Figure 3:
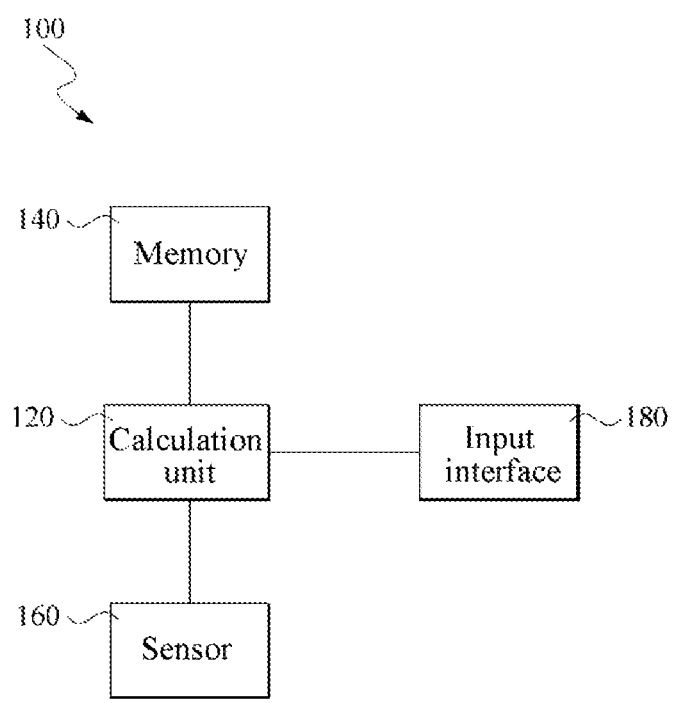
FIG. 3 is a schematic block diagram of an embodiment of a computer system according to the disclosure.

FIG. 3 is a schematic block diagram of an embodiment of a computer system according to the disclosure. As shown in FIG. 3, the computer system 100 includes a memory 140, an input interface 180, a calculation unit 120, and at least one sensor 160 (as shown in this embodiment).

Refer to FIG. 1, FIG. 2, and FIG. 3. The memory 140 is configured to store a first algorithm and a second algorithm. The first algorithm is determined based on a third data type, and the second algorithm is determined based on a first data type and a second data type. The first data type is related to the second data type, and the third data type is related to the first data type and the second data type. In an embodiment, the memory 140 is a memory built in a mainboard (such as a flash memory), a DRAM, a hard disk, a solid-state disk, or the like.

The input interface 180 is configured to input a target value and at least one input parameter. The target value and the at least one input parameter are related to at least one of the first data type and the second data type. In an embodiment, the input interface 180 is a firmware interface such as a basic input/output system (BIOS).

The calculation unit 120 is configured to calculate an input value of the third data type by using the first algorithm, and calculate an estimated value of the second data type by using the second algorithm, the target value, the at least one input parameter, and the input value. In an embodiment, the calculation unit 120 is an electronic element having a computing capability such as a CPU or a microcontroller.

The sensor 160 is configured to detect information about at least one of the first data type, the second data type, and the third data type in the computer system. In an embodiment, the sensor 160 is a sensor built in the mainboard, and is configured to detect information such as a temperature, a voltage, a current, power consumption, an operating frequency, and a cooling fan speed. The information is used for selecting the first algorithm and the second algorithm, or used for training an algorithm to determine a parameter of a formula.

Compared with a conventional computer system management method, the computer system management method provided in the disclosure dynamically adjusts settings of different computer systems based on differences between the computer systems and aspects to be optimized, such as calculation performance, heat dissipation efficiency, and energy conservation, thereby avoiding the impacts when only one setting is provided in the conventional system management. Therefore, the computer system management method provided in the disclosure properly adjusts settings of various different computer systems based on users' requirements.

The foregoing descriptions are merely preferred embodiments of the disclosure and are not intended to limit the disclosure in any way. Any person skilled in the art can make any form of equivalent replacement or modification to the technical means and technical contents disclosed by the disclosure without departing from the scope of the technical means of the disclosure, and such equivalent replacement or modification does not depart from the contents of the technical means of the present disclosure and still falls within the protection scope of the disclosure.

What is claimed is:

1. A computer system management method, comprising:
setting a target value and at least one input parameter, wherein the target value and the at least one input parameter are related to at least one of a first data type and a second data type, and the first data type is related to the second data type, wherein the first data type and the second data type are an operating frequency of a central processing unit (CPU) and an operating voltage of the CPU respectively;
selecting a first algorithm based on a third data type, and calculating an input value of the third data type by using the first algorithm, wherein the third data type is related to the first data type and the second data type, wherein the third data type is a heat dissipation capability of a heat sink, a temperature of a mainboard, information about a memory, or information about a graphics card;
selecting a second algorithm based on the target value, the at least one input parameter, and the input value, and calculating an estimated value of the second data type by using the second algorithm; and
adjusting settings of a computer system based on the estimated value.

2. The computer system management method according to claim 1, wherein the first algorithm is at least related to a temperature parameter, a power consumption parameter, and a voltage parameter.

3. A computer system management method, comprising:
setting at least one input parameter, wherein the input parameter is related to at least one of a first data type and a second data type, and the first data type is related to the second data type, wherein the first data type and the second data type are an operating frequency of a central processing unit (CPU) and an operating voltage of the CPU respectively;
selecting a first algorithm based on a third data type, and calculating an input value of the third data type by using the first algorithm, wherein the third data type is related to the first data type and the second data type, wherein the third data type is a heat dissipation capability of a heat sink, a temperature of a mainboard, information about a memory, or information about a graphics card;
selecting a second algorithm based on the at least one input parameter and the input value, and calculating an estimated value of the second data type by using the second algorithm; and
adjusting settings of a computer system based on the estimated value.

4. The computer system management method according to claim 3, wherein the first algorithm is at least related to a temperature parameter, a power consumption parameter, and a voltage parameter.

5. A computer system, comprising:
- at least one sensor, configured to detect information about at least one of a first data type, a second data type, and a third data type, wherein the first data type is related to the second data type, and the third data type is related to the first data type and the second data type, wherein the first data type and the second data type are an operating frequency of a central processing unit (CPU) and an operating voltage of the CPU respectively;
- a memory, configured to store a first algorithm and a second algorithm, wherein the first algorithm is determined based on the third data type, and the second algorithm is determined based on the first data type and the second data type, wherein the third data type is a heat dissipation capability of a heat sink, a temperature of a mainboard, information about a memory, or information about a graphics card;
- an input interface, configured to input a target value and at least one input parameter, wherein the target value and the at least one input parameter are related to at least one of the first data type and the second data type; and
- a calculation unit, configured to calculate an input value of the third data type by using the first algorithm, calculate an estimated value of the second data type by using the second algorithm, the target value, the at least one input parameter, and the input value and adjusts settings of a computer system based on the estimated value.

6. The computer system according to claim 5, wherein the first algorithm is at least related to a temperature parameter, a power consumption parameter, and a voltage parameter.

* * * * *